US012675098B2

(12) United States Patent
Hämynen

(10) Patent No.: US 12,675,098 B2
(45) Date of Patent: Jul. 7, 2026

(54) UPDATING AN INDUSTRIAL AUTOMATION DEVICE

(71) Applicant: ABB Schweiz AG, Baden (CH)

(72) Inventor: Kimmo Hämynen, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 477 days.

(21) Appl. No.: 18/306,659

(22) Filed: Apr. 25, 2023

(65) Prior Publication Data

US 2023/0350393 A1     Nov. 2, 2023

(30) Foreign Application Priority Data

Apr. 29, 2022    (EP) ..................................... 22170804

(51) Int. Cl.
*G05B 19/418*     (2006.01)
*G06F 8/65*     (2018.01)

(52) U.S. Cl.
CPC ... *G05B 19/41855* (2013.01); *G05B 19/4184* (2013.01); *G06F 8/65* (2013.01)

(58) Field of Classification Search
CPC ...... A61K 31/18; A61K 47/542; A61K 47/64; C07K 14/62; G05B 19/4184; G05B 19/41855; G06F 8/65; H04L 67/12; H04L 67/34
See application file for complete search history.

(56) References Cited

U.S. PATENT DOCUMENTS

2006/0232068 A1* 10/2006 Shirlee ...................... F03G 7/10
                                                            290/1 R
2013/0211546 A1* 8/2013 Lawson .................... G06F 1/14
                                                            700/9

2016/0345265 A1* 11/2016 Lee ................... H04W 52/0235
2017/0171950 A1* 6/2017 Barna ................. H04L 12/2827
2018/0054318 A1* 2/2018 Schmirler ............. G06Q 10/06
2021/0337355 A1* 10/2021 Sobol .................... H04W 4/023

FOREIGN PATENT DOCUMENTS

CN          104074771 A  * 10/2014
EP            2960841 A1    12/2015

OTHER PUBLICATIONS

European Search Report; Application No. EP 22 17 0804; Issued: Sep. 20, 2022; 2 Pages.
Siemens; "Description of the firmware update for failsafe S7-1500 I/O modules"; Entry belongs to product tree folder(s): Automation Technology Automation Systems Industrial Automation Systems SIMATIC PLC Advanced Controller S7-1500 I/O modules Fail-Safe Digital/Analog I/O Modules; Oct. 24, 2017; Retrieved from the Internet on Sep. 9, 2022; 2 Pages.

* cited by examiner

*Primary Examiner* — Kidest Worku
(74) *Attorney, Agent, or Firm* — Greenberg Traurig, LLP

(57)     ABSTRACT

To update an industrial automation device, the industrial automation device may include electronic part-powered unit for connecting wirelessly to a low-power wide area network, the electronic part-powered unit including first identification information in the low-power wide area network and being arranged at least to receive data addressed to the first identification information and store the data received. The industrial automation device may also include a control unit for updating, in response to connecting the industrial automation device to the electrical network, one or more features in the industrial automation device by the data received.

19 Claims, 3 Drawing Sheets

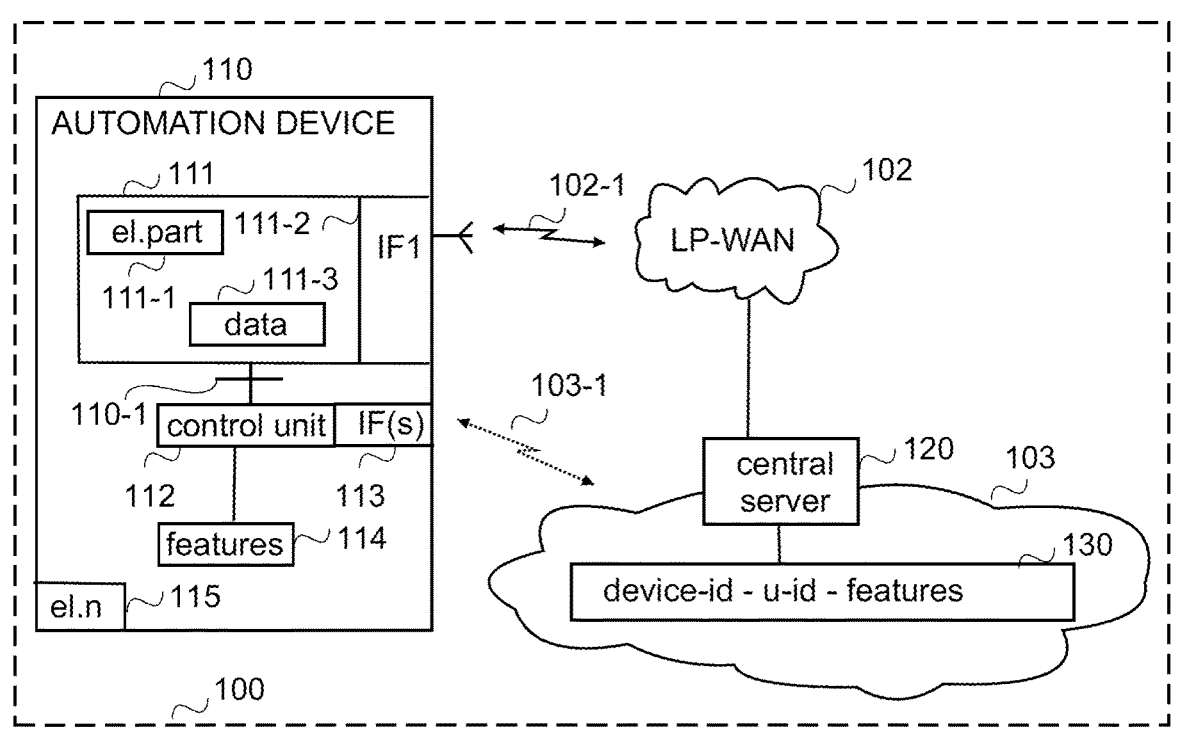
*FIG.1*
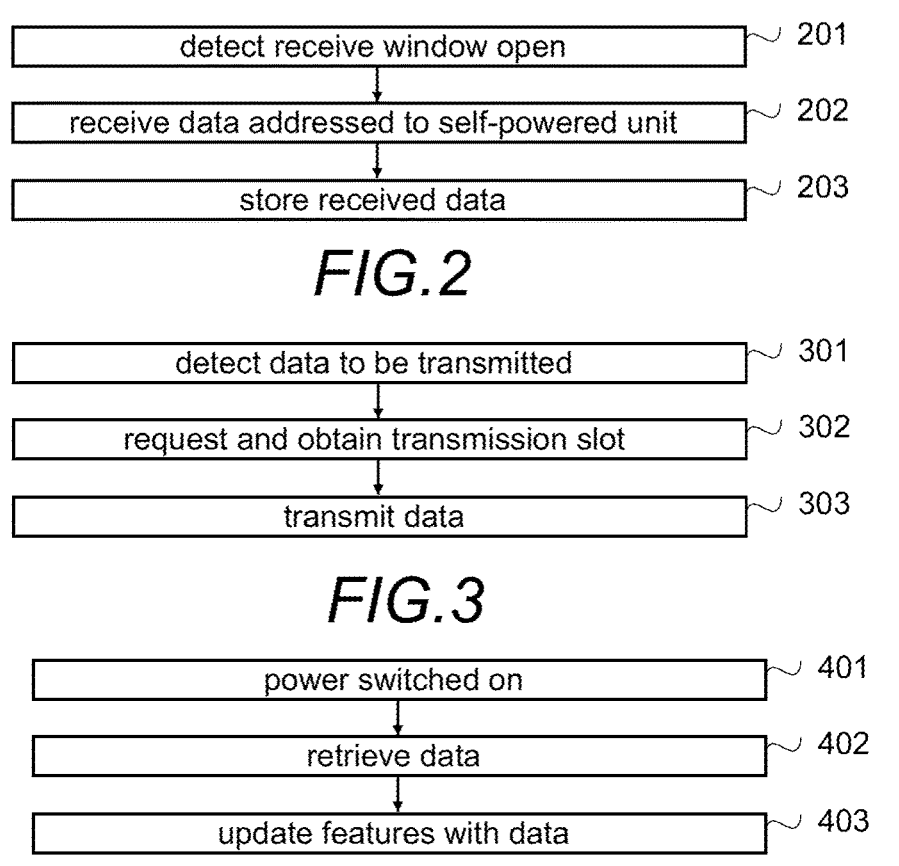
| detect receive window open | 201 |
| receive data addressed to self-powered unit | 202 |
| store received data | 203 |
*FIG.2*
| detect data to be transmitted | 301 |
| request and obtain transmission slot | 302 |
| transmit data | 303 |
*FIG.3*
| power switched on | 401 |
| retrieve data | 402 |
| update features with data | 403 |
*FIG.4*

UPDATING AN INDUSTRIAL AUTOMATION DEVICE

TECHNICAL FIELD

The present invention relates to updating one or more features in an industrial automation device.

BACKGROUND

After being manufactured, an industrial automation device may be shipped to a warehouse, stay on the warehouse some time, and then be delivered to an industrial plant. To update the industrial automation device, for example with one or more bug fixes and/or with one or more industrial plant-specific features, during that time one may have to unpack the industrial automation device, connect the industrial automation to electrical network or power, update the industrial automation device via a control board, for example, disconnect the industrial automation device from the electrical network and repack the industrial automation device. It may be that the updating process takes place more than once. Another commonly used way to update the industrial automation device is to collect features that are to be updated to one or more memory sticks that are sent to the industrial plant for updating the industrial automation device during start up. There is a need for an easier way to update the industrial automation devices.

SUMMARY

The invention relates to an industrial automation device, a method, and a system, which are characterized by what is stated in the independent claims. Further embodiments are disclosed in the dependent claims.

According to an aspect there is provided an industrial automation device comprising at least: at least one electronic part-powered unit for connecting wirelessly to a low-power wide area network, said electronic part-powered unit comprising first identification information in the low-power wide area network and being arranged at least to receive data addressed to the first identification information and store the data received; at least one power supply for connecting the industrial automation device to an electrical network; and at least one control unit for updating, in response to connecting the industrial automation device to the electrical network, one or more features in the industrial automation device by the data received.

In an embodiment, the electronic part-powered unit is a self-powered low consumption unit.

In an embodiment, the electronic part-powered unit is arranged to be powered by one or more batteries or one or more capacitors or one or more supercapacitors.

In an embodiment, the electronic part-powered unit comprises at least one sensor or is connected to at least one sensor.

In an embodiment, the electronic part-powered unit is further configured to transmit sensed data to the low-power wide area network.

In an embodiment, the electronic part-powered unit is an end-device in a Helium network.

In an embodiment, the data received comprises at least one of one or more configurations, one or more parameters, one or more parameter settings, one or more licenses, one or more license keys, one or more software modules, one or more applications, one or more add-ons to applications, or one or more bug fixes.

In an embodiment, the control unit is configured to check, before updating the one or more features, whether the data received meets predefined safety criteria, and to update the one or more features with received data that meets the predefined safety criteria.

In an embodiment, the industrial automation device is a drive.

According to an aspect there is provided a method for updating an industrial automation device, the method comprising: receiving, by an electronic part-powered unit comprised in the industrial automation device, over a low-power wide area network, data; storing, by the electronic part-powered unit, the data received; and updating, by the industrial automation device, in response to connecting the industrial automation device to an electrical network, one or more features in the industrial automation device by the data received.

In an embodiment, the updating further comprises: retrieving, by the industrial automation device, the data received from a memory of the electronic part-powered unit.

In an embodiment, the method further comprises: performing the updating periodically when the industrial automation device is connected to the electrical network.

According to an aspect there is provided a system comprising: at least one industrial automation device comprising: at least one electronic part-powered unit for connecting wirelessly to a low-power wide area network, said electronic part-powered unit comprising first identification information in the low-power wide area network and being configured at least to receive data addressed to the first identification information and store the data received; at least one power supply for connecting the industrial automation device to an electrical network; and at least one control unit for updating, in response to connecting the industrial automation device to the electrical network, one or more features in the industrial automation device by the data received; and at least one server configured to connect to a low-power wide area network, send over the low-power wide area network to at least one of the at least one industrial automation device data comprising one or more updates to features in said at least one industrial automation device, said data being addressed to the electronic part-powered unit.

In an embodiment, at least one of the at least one electronic part-powered unit comprised in at least one of the at least one industrial automation device is further configured to transmit sensed data to the low-power wide area network; and at least one of the at least one server is configured to receive over the low-power wide area network data sensed on at least one of the one or more industrial automation device.

In an embodiment, at least one of the at least one electronic part-powered unit comprised in at least one of the at least one industrial automation device is a self-powered low consumption unit.

In an embodiment, at least one of the at least one electronic part-powered unit comprised in at least one of the at least one industrial automation device is configured to be powered by one or more batteries or one or more capacitors or one or more supercapacitors.

In an embodiment, at least one of the at least one electronic part-powered unit comprised in at least one of the at least one industrial automation device is configured to be powered by one or more batteries or one or more capacitors or one or more supercapacitors.

In an embodiment, at least one of the at least one electronic part-powered unit comprised in at least one of the at least one industrial automation device comprises at least one sensor or is connected to at least one sensor.

In an embodiment, at least one of the at least one control unit comprised in at least one of the at least one industrial automation device is configured to check, before updating the one or more features, whether the data received meets predefined safety criteria, and to update the one or more features with received data that meets the predefined safety criteria.

In an embodiment, the low-power wide area network is a low-power long range wide area network and the at least one electronic part-powered unit is an end-device in the low-power long range wide area network.

In an embodiment, the low-power long range wide area network is a Helium network; and the at least one electronic part-powered unit is an end-device in the Helium network.

BRIEF DESCRIPTION OF THE DRAWINGS

In the following, exemplary embodiments will be described in greater detail with reference to accompanying drawings, in which FIG. 1 shows simplified architecture of a system and block diagrams of exemplified equipments;

FIGS. 2 to 6 are flow chart illustrating examples of functionalities.

DETAILED DESCRIPTION

Figure 5:
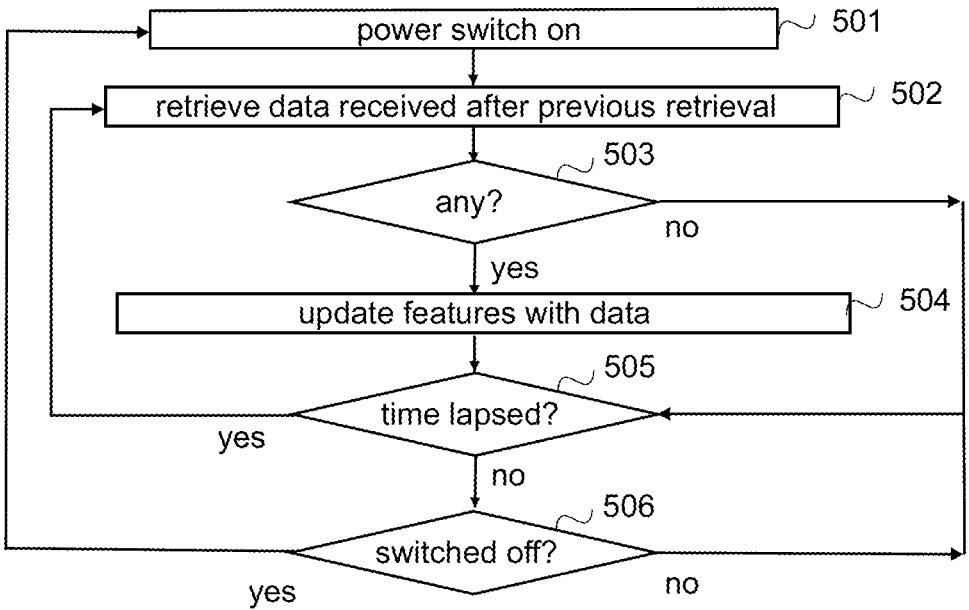

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments/examples to consist of only those features that have been mentioned and such embodiments may contain also features/structures that have not been specifically mentioned.

The present invention is applicable to any industrial automation device whose features can be updated.

An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system comprises any number of shown elements, other equipment, and structures that are not illustrated.

In the embodiment illustrated in FIG. 1, the system 100 comprises one or more industrial automation devices 110 (only one illustrated in FIG. 1), a low-power wide area network 102 (LP-WAN), a central server 120 and one or more clouds 103 (only one illustrated in FIG. 1) comprising a cloud storage 130.

The industrial automation device 110, or shortly automation device, refers to electronic equipment that is used for controlling one or more industrial processes having one or more downstream devices. For example, industrial automation devices may control the position, speed, torque and/or direction of electric motors in conveyors, grinders, winders, pumps and/or fans. An industrial automation device may control the speed and/or torque of a motor by changing the frequency, current and/or voltage of the electrical supply to the motor, for example. A non-limiting list of examples of industrial automation devices includes drives, frequency converters, AC/DC converters, DC/AC converters, DC/DC converters, programmable logic controllers, switches, motion controllers or motion drives, servo motors, soft starters, wind turbines, integral motors, and solar inverters.

The industrial automation device 110 comprises one or more electronic part-powered means 111. An electronic part-powered means may be a self-powered low consumption unit, or any other type of LP-WAN communication part in the industrial automation device. Below the term "self-powered low consumption unit" is used as a synonym to electronic part-powered means, i.e. to cover all possible types of electronic part-powered means. The self-powered low consumption unit 111 may be an end device, for example a sensor (sensor device), or a corresponding end-point in the low-power wide area network 102, the endpoint comprising, for example, at least a chipset and a receiver/transceiver.

The self-powered low consumption unit comprises one or more electronic parts 111-1 (el.part) for providing the self-powered low consumption unit 111 with power. In other words, the self-powered low consumption unit comprises one or more electronic parts to power the self-powered low consumption unit so that the self-powered low consumption unit is operable without being connected to an electrical network. An electronic part 111-1 may be arranged to accommodate one or more batteries and/or one or more capacitors, for example supercapacitors, to power the self-powered low consumption unit, especially to enable the self-powered low consumption unit to function even when the industrial automation device is not switched on and the powered. Hence, the self-powered low consumption unit may be called a battery-powered unit or a (super)capacitor-powered unit. The self-powered low consumption unit 111 further comprises an interface (IF1) 111-2 via which the self-powered low consumption unit 111 is configured to communicate over a wireless connection 102-1 with the low-power wide area network 102 at least to receive small amounts of data using a low-power wide area network protocol. The self-powered low consumption unit 111 may be used at least when the industrial automation device is not connected to the electrical network.

The self-powered low consumption unit 111 also comprises a memory 111-3 for storing at least data received over the wireless connection 102-1. Examples of the data received will be given below. Depending on an implementation, the memory 111-3 may also store data to be transmitted over the wireless connection 102-1. The self-powered low consumption unit 111 has identification information, for example an identifier, called herein a unit identifier u-id, identifying the self-powered low consumption unit 111 uniquely in the low-power wide area network 102. The unit identifier may be stored to the memory 111-3 and used in data transmission in the low-power wide area network, for example to indicate a recipient, when the data is addressed (targeted) to the self-powered low consumption unit 111. The memory 111-3 may also store information, for example address information, or identification information, that can be used to communicate with the central server. Depending on an implementation, the memory 111-3 in the self-powered low consumption unit 111 may further store information identifying the industrial automation device and/or one or more keys for decrypting data received and/or encrypting data to be transmitted.

The self-powered low consumption unit 111 may be, and/or comprise, or be comprised in, or connected to, means detecting changes in the self-powered low consumption unit 111 or in the industrial automation device 110 or in environment, and may be configured to receive and/or fetch and/or store to the memory 111-3 and/or report the changes, for example by transmitting corresponding data over the wireless connection 102-1. A non-limiting list of changes include location (geographical position), determined by a global positioning system unit or device, temperature, sensed for example by the self-powered low consumption unit or a temperature sensor, humidity, sensed for example by the self-powered low consumption unit or a humidity sensor, and vibration sensed for example by the self-powered low consumption unit or a vibration sensor. When a separate sensor, unit or device is used and the self-powered low consumption unit 111 is configured to fetch the change (sensed information), the memory 111-3 may comprise information indicating how or wherefrom to fetch the change (sensed information).

The industrial automation device 110 further comprises a control unit 112 configured to control operation of the industrial automation device. The control unit 112 further provides means for updating features in the industrial automation device 110, for example as will be described in detail below. In other words, the control unit 112 is configured to update features using data in the self-powered low consumption unit, or more precisely in its memory 111-3. For that purpose, the control unit 112 is connected via an interface 110-1 to the self-powered low consumption unit 111. The interface 110-1 may be a serial peripheral interface (SPI) or a universal asynchronous receiver-transmitter (UART) interface, for example. The control unit 112 may be configured to communicate, when the industrial automation device 110 is connected to an electric network, and power being switch on, via one or more modules 113, with the cloud over a connection 103-1 either directly or via a local connection at an industrial site or at a manufacturing site, for example. The control unit may be implemented using software and/or hardware and/or firmware components, for example by one or more processors, microprocessors or chipsets, programmed to provide the means for updating the features.

The module 113 may provide at least one wireless interface via which module 113 features and parameters of the industrial automation device 110 in the memory 114 may be adjusted or acquired via the control unit, when power is on in the industrial automation device 110, and the functions of the industrial automation device 110 otherwise controlled by a person locating on the site and/or remotely from a service center (not illustrated separately in FIG. 1) in the cloud 103. The module 113 may be a separate device (terminal device), or a device detachable connectable to the industrial automation device, or equipment integrated to the industrial automation device. At the simplest, the module may be a mere interface.

Further, the industrial automation device 110 comprises one or more memories, depicted by one memory 114 in FIG. 1, in which features, or a list of features, including values and/or content for features are stored, to be used for example when the industrial automation device is running. It should be appreciated that term "feature" covers herein also feature versions (feature variants). A non-limiting list of examples of features that may be stored include parameters, parameter values (parameter settings), software and parameters to configure different products including different power range ratings, one or more software modules, for example original equipment manufacturer (OEM) firmware software modules, software versions, one or more configurations, one or more licenses and/or license keys required for application (s), or for add-ons to application(s), or for software module (s), to run, applications and add-ons to applications (with different versions, if two or more different versions exits), bug fixes to applications and software bug fixes. A configuration means herein one set of parameters/parameter values defining an application or an application scenario. (One application may have different application scenarios resulting that said application have different behaviour.) Further, there may be features that are common for industrial automation devices, or to industrial automation devices of the same type as the industrial automation device 110, and features tailored for example for the industrial site, for example language version selected based on location of the site, or site type, or are device-specific, such as a code required to establish the local connection or the connection 103-1 to the industrial automation device in question. The memory 114 may also comprise other information, such as the information identifying the industrial automation device 110, for example a device identifier, device-id, and/or one or more keys for decrypting or encrypting, wherein a key or some of the keys may be the same as those in the memory 111-3 in the self-powered low consumption unit and/or the information identifying the self-powered low consumption unit and/or one or more functional safety criteria, examples of which will be given below. The memory 114 may also comprise the unit identifier (per a self-powered low consumption unit if the industrial automation device 110 comprises more than one self-powered low consumption units) and/or information identifying the central server 120.

The industrial automation device 110 further comprises means 115 (el.n), for example one or more power supplies, for connecting the industrial automation device 110 to the electric network to power the industrial automation device when switched on.

The low-power wide area network 102 may comprise one or more sub-networks (not illustrated in FIG. 1), and it may be a decentralized network formed by different apparatuses, an apparatus functioning as a gateway, or an access node, or a base station or a router or a hotspot in the low-power wide area network. Such an apparatus provides to the self-powered low consumption unit 111 the wireless connection 102-1 and access to the internet and via the internet to the central server 120, using a corresponding low-power wide area network protocol. Such a protocol is preferably designed to facilitate low power data transmission and reception, i.e. to carry small amounts of data, so that battery-powered sensors, for example, can function for several years. The apparatus providing access and/or the self-powered low consumption unit 111 may be an Internet of Thing apparatus, and the low-power wide area network 102 may be called an Internet of Things network.

The low-power wide area network 102 may be a long-range low-power wide area network, for example the Helium network. The Helium network is a blockchain based decentralized network of nodes called hotspots. In the Helium network a hotspot is a combination of a wireless gateway and a blockchain mining device. Internet of Things devices, or corresponding low powered wireless devices, for example the self-powered low consumption unit 111 as an end-device in the Helium network, may send or receive data across the Helium network via the wireless gateways using LoRaWAN® protocol for communications. Further examples of low-power wide area networks include SigFox, Loriot, MachineQ, Senet, to name a few. Another example of a protocol that can be used for communications in the low-power wide area network is MQTT-SN (MQTT for sensor networks) protocol, which is a lightweight, publish-subscribe network protocol that transports messages between devices, over a wired or wireless connection.

The central server 120 may be implemented as a centralized or decentralized server in the low-power area network. The central server 120 may be configured to determine an optimal data rate and transmit power to transmit (send down) data to the self-powered low consumption unit 111 over the low-power area network. The central server 120 has in the low-power area network an organizationally unique identifier, or corresponding identifying information, so that transmissions can be routed to the central server in the low-power area network. The organizationally unique identifier may identify the manufacturer of the industrial automation device 110. The central server 120 may be a MQTT message broker, or a network server on the Helium, for example, that may be under control of the manufacturer, or more precisely under control of or comprised in a cloud server of the manufacturer, or any other organization responsible for features to be updated in the industrial automation device. Hence, in the illustrated example, the central server 120 is further arranged to have access to the cloud storage 130. Further, it should be appreciated that even though in FIG. 1 there is one central server 120, one organization may have more than one central server.

In the illustrated example, the cloud storage 130 comprises at least information associating the industrial automation device with its self-powered low consumption unit, for example associating the device identifier device-id with the unit identifier u-id. Further the cloud storage may associate the industrial automation device with features installed to the industrial automation device and/or features to be updated/installed to the industrial automation device and/or features that are being currently updated as data transmitted to the self-powered low consumption unit 111. For example, the cloud storage may comprise information of software version and original equipment manufacturer (OEM) software modules, if any installed, and configurations. Naturally the cloud storage 133 may comprise other information, for example key information for encrypting/decrypting transmissions.

The cloud 103 providing the cloud storage 133 may be a private cloud (operated solely for an organization), a community cloud (operated for organizations sharing e.g., mission and security requirements), a public cloud (provider sells cloud services) or a hybrid cloud, i.e. a composition of two or more different clouds. Examples of public cloud providers include Amazon Web Services (AWS), Google Cloud Platform (GCP), Microsoft Azure, etc.

The details how to establish the connection 103-1 between the industrial automation device 110 (module 113) and the cloud, and protocols used for the connection 103-1 bear no significance to the described examples and hence are not described in detail herein.

The details of low-power wide area networks, the central server, clouds and cloud storages, are well known by persons skilled in the art and are, as such, irrelevant to the examples. Therefore, there is no need to describe them in more detail here.

FIGS. 2 and 3 describe example functionalities of the self-powered low consumption unit. In the examples it is assumed that LoRaWAN® protocol is used and that the self-powered low consumption unit is an end-device of class A, class B or class C, without limiting the examples of such solutions. In class A, an end-device's uplink transmission is followed by two short downlink receive windows. In class B, the end-device opens extra receive windows at scheduled times. For that the end-device receives a time-synchronized beacon from the gateway (hotspot). This allows the central server to know when the end-device is listening. Class C allows nearly continuously open receive windows which may be closed only when the end-device is transmitting. The details of transmissions and receptions, including encrypting and decrypting data if encrypting and decrypting are used in transmissions, are well known, and hence are not described in more detail herein. Further, implementing the examples to other low-power long range network protocols is straightforward for a person skilled in the art.

Referring to FIG. 2, the self-powered low consumption unit detects in step 201 that a receive window is open, receives in step 202 data addressed to the self-powered low consumption unit (to the end-device), and stores in step 203 the data. The data may be stored with time information indicating a time when it is stored or received.

Hence, updates to features can be delivered to the industrial automation device when it is in a warehouse or being transported to its final place. For example, during transportation of the industrial automation device tailored features may be delivered to the industrial automation device.

In the example of FIG. 3, the self-powered low consumption unit is further configured to report a change or changes to the central server, as described above with FIG. 1. When the self-powered low consumption unit detects in step 301 that there is data, i.e. the change or changes, to be transmitted to the central server, the self-powered low consumption unit request and obtains in step 302 a transmission slot for the data, and transmits in step 303 the data in the transmission slot. This enables collecting feedback on the industrial automation device.

Figure 6:
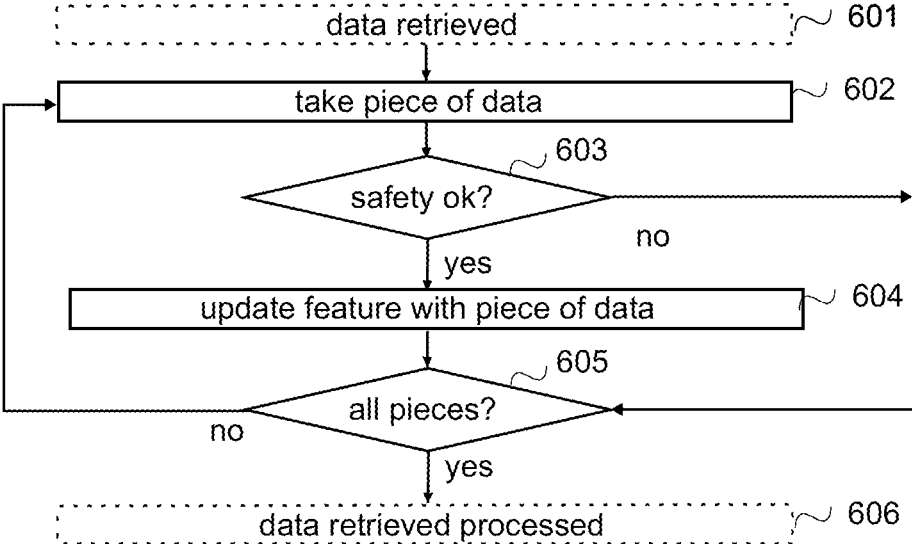

FIGS. 4, 5 and 6 describe example functionalities of the industrial automation device, or more precisely, example functionalities of the control unit, or corresponding means for updating.

Referring to FIG. 4, when it is detected in step 401 that power is switched on (the industrial automation device has been connected to power or electric network), data is retrieved in step 402 from the memory of the self-powered low consumption unit, and features are updated in step 403 with the data retrieved. For example, license keys may be updated. Hence, less time is required at site to finalize the industrial automation device for intended use during startup/commissioning.

In the example of FIG. 5, it is assumed that some updates may be received via the self-powered low consumption unit even after the start-up process described in FIG. 4. Further, as a background process, not described in FIG. 5, time information indicating the last data retrieval time is maintained.

Referring to FIG. 5, when it is detected in step 501 that power is switched on (the industrial automation device has been connected to power or electric network), data that the self-powered low consumption unit has received after previous retrieval of data is retrieved in step 502 from the memory of the self-powered low consumption unit.

Then it is checked in step 503, whether any data was retrieved in step 502. If data was retrieved (step 503: yes), features are updated in step 504 with the data retrieved, and the process continues to step 505 to monitor, whether a preset time after step 502 has lapsed or the power is switched off (step 506).

If no data was retrieved (step 503: no), the self-powered low consumption unit had not received any new data, and the process monitors, whether a preset time after step 502 has lapsed (step 505) or the power is switched off (step 506).

When the time has lapsed (step 505: yes), the process returns to step 502 to retrieve data the self-powered low consumption unit has received after previous retrieval of data.

When the power is switched off, the process starts again in step 501 when the power is switched on.

FIG. 6 describes an example functionality that may be performed after data has been retrieved from the self-powered low consumption unit (or more precisely, from its memory) to ensure that one or more safety criteria relating to updates and/or a feature to be updated is met (fulfilled) before performing the updating. The safety criteria may relate to cybersecurity and/or to functional safety update requirements. For example, most of the industrial automation devices include safe torque off (STO) function. A non-limiting list of examples of other safety functions that an industrial automation device may comprise include safe stop 1 (SS1), safe stop emergency (SSE), safe brake control (SBC), safely-limited speed (SLS), safe maximum speed (SMS) and prevention of unexpected startup (POUS). The safety function and criteria relating to functional safety update requirements are known by one skilled in the art, details of them are not relevant to the disclosed example functionality, and hence there is no need to describe them in more detail herein.

Referring to FIG. 6, when the data has been retrieved (step 601) from the self-powered low consumption unit, a piece of data is taken in step 602 to be processed. A piece of data means herein one update to one feature. Then it is checked in step 603, whether the piece of data meets safety criteria, i.e., is its safety ok. For example, if the feature to update relates to a safety function, it is checked whether the update (piece of data) meets corresponding functional safety update requirements. It should be appreciated that there may be features, for example license keys, for which there is no specific safety criteria, in which case they will meet the safety criteria checked in step 603. Depending on the implementation, a common safety criterion, or common safety criteria, for example relating to cybersecurity, may be checked piece by piece in step 603, or as one go for the data, as will be described with the example in FIG. 7.

If the piece of data meets the safety criteria (step 603: yes), the feature is updated in step 604 with the piece of data and then it is checked in step 605, whether all pieces of data retrieved have been processed. If not (step 605: no), the process returns to step 602 to process the next piece of data.

If the piece of data does not meet the safety criteria (step 603: no), the process proceeds to step 605 to check whether all pieces of data retrieved have been processed. In other words, an update not meeting the safety criteria is not used to update a feature, thereby ensuring that the industrial automation device has proper functional safety features, for example. In another implementation, a fault message may also be sent and/or outputted to indicate an unacceptable update.

When all pieces of the data have been processed (step 605: yes), the data retrieved have been processed (step 606), and the thus triggered updating can end.

Figure 7:
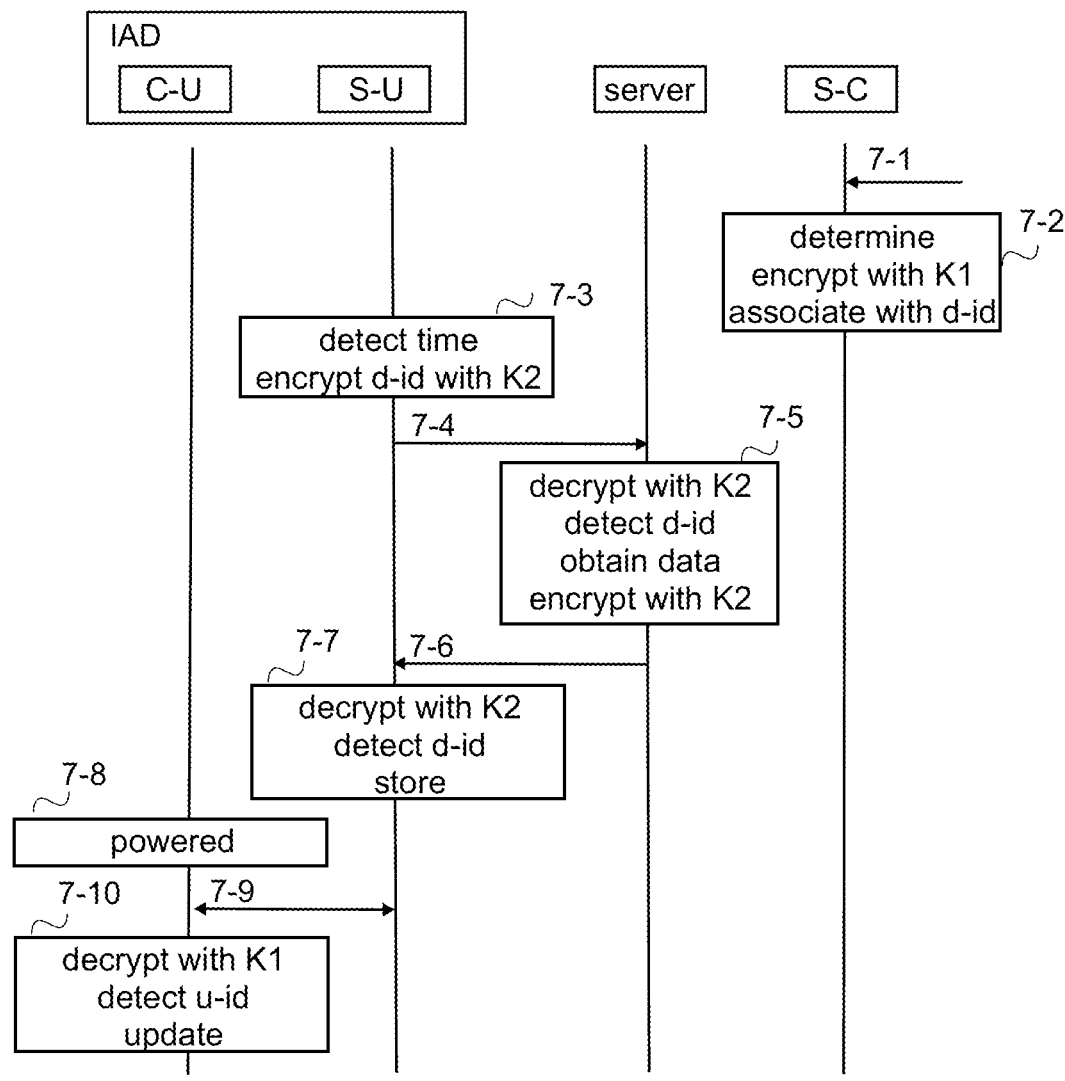
FIG. 7 illustrates an example of information exchange and examples of functionalities.

FIG. 7 illustrates an example of information exchange between a control unit C-U and a self-powered low consumption unit S-U in an industrial automation device IAD, information exchange over the low-power wide area network, and different example functionalities of the control unit, the self-powered low consumption unit, a server, for example a central server, connected to the low-power wide area network and to a cloud storage (not illustrated) whereto apparatuses, depicted by S-C, may store information and/or retrieve information. Further, in the illustrated example it is assumed that shared secrets are used in encrypting/decrypting and encrypting and decrypting succeeds, for the sake of clarity. Implementing the example using public key infrastructure is a straightforward process for one skilled in the art. Further, in the illustrated example of FIG. 7, different identifiers are used as an additional security providing feature. It should be appreciated that the example may be implemented without the additional security providing feature.

Referring to FIG. 7, in a hypothetical example, the IAD, identified by d-id, has just arrived in a warehouse when a salesperson receives an order for an industrial automation device, the order requiring to activate licensed software modules. The salesperson selects, using the S-C and information in the cloud storage, the IAD and OEM software package corresponding to the order, and provides an input 7-1 to update features in the IAD to correspond to the OEM software package by uploading missing features to the IAD. In the illustrated example, the S-C, determines in step 7-2 data to be delivered to update the IAD. More precisely, using the d-id of the IAD, the S-C retrieves from the cloud storage the u-id of the S-U and the current software version number of the IAD. Further, the S-C retrieves the current content of the selected OEM software package. Based on the content and the software version number of the IAD the S-C determines one or more pieces of data to be uploaded/delivered to the IAD, encrypts in step 7-2 the one or more pieces and the u-id (as additional security providing feature) with K1 to be data to be delivered, and stores the data associated with the d-id to the cloud storage with information indicating that the data is waiting to be delivered for update. Naturally device information in the cloud storage may be updated correspondingly.

When the S-U in the IAD detects in step 7-3 that it is time to request whether there is any data to be downloaded, the S-U encrypts in step 7-3, as additional security providing feature, the d-id with K2, and transmits the request (message 7-4) over the low-power wide area network to the server.

In response to receiving message 7-4, the server decrypts in step 7-5 the message with K2, detects the d-id, uses the d-id to obtain in step 7-5 the data (stored in step 7-2) from the cloud storage, and encrypts the data with K2. It should be appreciated that in another implementation the u-id may be used to obtain the corresponding data, and/or as a further step the server may be configured to check that the d-id in the message and the u-id who sent the message have the same values as device and unit identifiers associated with each other in the cloud storage, and only if that is the case, obtains the data. The data obtained may be encrypted pieces of data (one piece being the encrypted u-id), a piece having a size that is, after the piece is encrypted with K2, at most a payload size of the low-power wide area network protocol used. After encrypting the obtained data, the server sends the data in one or more messages 7-6 to the S-U.

The S-U decrypts in step 7-7 the content (payload) in the one or more messages 7-6 with K2, and detects in step 7-7 that the data contains, as the additional security related feature, a d-id that has the same value as the d-id in the memory, and therefore stores in step 7-7 the data received to its memory. In the illustrated example, should the values of d-ids be different, no storing of the data would take place.

The above process may be triggered more than once, for example during the transportation, for example because some customer-related parameters or configurations being defined and/or common software updates takes place.

When the IAD is on a site, and is connected to power, the C-U is powered (step 7-8) and retrieves (message 7-9) from the memory in the S-U the data received (pieces of data received) and decrypts in step 7-10 the data received with K1. Then in the illustrated example, the C-U detects in step 7-10 that the data contains, as the additional security related feature, a u-id that has the same value as the u-id in the memory, and therefore updates in step 7-10 one or more features in the IAD with the data received, for example as described above with FIG. 6.

As can be seen from the above examples, an easier way, compared with use of memory sticks and/or unpacking and repacking, to update an industrial automation device is achieved with integrating one or more self-powered low consumption units to the industrial automation device. The updating can take place even when the industrial automation device is being transported to a warehouse or from the warehouse. Furthermore, safety and cybersecurity related issues can be taken care by using predefined safety criteria, which may include, as described with FIGS. 6 and 7, encrypting/decrypting and/or safety requirements to be met and/or use of additional security related features.

The steps, related functions and information exchange described above in FIGS. 2 to 7 are in no absolute chronological order, and some of the steps and/or information exchange may be performed simultaneously or multiple times or in an order differing from the given one. Other functions can also be executed between the steps or within the steps. Some of the steps and/or information exchange or part of the steps and/or information exchange can also be left out or replaced by a corresponding step or part of the step.

The techniques described herein may be implemented by various means so that an apparatus, for example an industrial automation device, or its units, or a server, implementing one or more functions described with an example/implementation comprises not only prior art means, but also specific means for implementing the one or more functions described with an example/implementation and the apparatus may comprise separate means for each separate function, or specific means may be configured to perform two or more functions. The specific means may be software and/or software-hardware and/or hardware and/or firmware components (recorded indelibly on a medium such as read-only-memory or embodied in hard-wired computer circuitry) or combinations thereof. Software codes may be stored in any suitable, processor/computer-readable data storage medium (s) or memory unit(s) or article(s) of manufacture and executed by one or more processors/computers, hardware (one or more apparatuses), firmware (one or more apparatuses), software (one or more modules), or combinations thereof. For a firmware or software, implementation can be through modules (e.g., procedures, functions, and so on) that perform the functions described herein.

It will be obvious to a person skilled in the art that, as technology advances, the inventive concept can be implemented in various ways. The invention and its embodiments are not limited to the examples described above but may vary within the scope of the claims.

What is claimed is:

1. An industrial automation device comprising at least:
   at least one electronic part-powered unit for connecting wirelessly to a low power wide area network, said electronic part-powered unit including first identification information in the low power wide area network and being arranged at least to receive data addressed to the first identification information and store the data received in a memory of the industrial automation device;
   at least one power supply for connecting the industrial automation device to an electrical network; and
   at least one control unit for updating, in response to connecting the industrial automation device to the electrical network, one or more features in the industrial automation device by the data received and stored in the memory of the industrial automation device.

2. The industrial automation device of claim 1, wherein the electronic part-powered unit is a self-powered low consumption unit.

3. The industrial automation device of claim 1, wherein the electronic part-powered unit is arranged to be powered by one or more batteries or one or more capacitors or one or more supercapacitors.

4. The industrial automation device of claim 1, wherein the electronic part-powered unit comprises at least one sensor or is connected to at least one sensor.

5. The industrial automation device of claim 4, wherein the electronic part-powered unit is further configured to transmit sensed data to the low power wide area network.

6. The industrial automation device of claim 1, wherein the electronic part-powered unit is an end-device in a Helium network.

7. The industrial automation device of claim 1, wherein the data received comprises at least one of one or more configurations, one or more parameters, one or more parameter settings, one or more licenses, one or more license keys, one or more software modules, one or more applications, one or more add-ons to applications, or one or more bug fixes.

8. The industrial automation device of claim 1, wherein the control unit is configured to check, before updating the one or more features, whether the data received meets predefined safety criteria, and to update the one or more features with received data that meets the predefined safety criteria.

9. The industrial automation device of claim 1, wherein the industrial automation device is a drive.

10. A method for updating an industrial automation device, the method comprising:
   receiving, by an electronic part-powered unit included in the industrial automation device, over a low power wide area network, data;
   storing, by the electronic part-powered unit, the data received in a memory of the industrial automation device; and
   updating, by the industrial automation device, in response to connecting the industrial automation device to an electrical network, one or more features in the industrial automation device by the data received and stored in the memory of the industrial automation device.

11. The method of claim 10, the updating further comprising:
   retrieving, by the industrial automation device, the data received from a memory of the electronic part-powered unit.

12. The method of claim 10, further comprising:
   performing the updating periodically when the industrial automation device is connected to the electrical network.

13. A system comprising:
   at least one industrial automation device comprising:
      at least one electronic part-powered unit for connecting wirelessly to a low power wide area network, said electronic part-powered unit including first identification information in the low power wide area network and being configured at least to receive data addressed to the first identification information and store the data received in a memory of the industrial automation device;

at least one power supply for connecting the industrial automation device to an electrical network; and at least one control unit for updating, in response to connecting the industrial automation device to the electrical network, one or more features in the industrial automation device by the data received and stored in the memory of the industrial automation device; and at least one server configured to connect to a low power wide area network, send over the low-power wide area network to at least one of the at least one industrial automation device data including one or more updates to features in said at least one industrial automation device, said data being addressed to the electronic part-powered unit.

14. The system of claim 13, wherein
at least one of the at least one electronic part-powered unit included in at least one of the at least one industrial automation device is further configured to transmit sensed data to the low power wide area network; and
at least one of the at least one server is configured to receive over the low power wide area network data sensed on at least one of the one or more industrial automation device.

15. The system of claim 13, wherein
at least one of the at least one electronic part-powered unit included in at least one of the at least one industrial automation device is a self-powered low consumption unit.

16. The system of claim 13, wherein
at least one of the at least one electronic part-powered unit included in at least one of the at least one industrial automation device is configured to be powered by one or more batteries or one or more capacitors or one or more supercapacitors.

17. The system of claim 13, wherein
at least one of the at least one electronic part-powered unit included in at least one of the at least one industrial automation device includes at least one sensor or is connected to at least one sensor.

18. The system of claim 13, wherein
at least one of the at least one control unit included in at least one of the at least one industrial automation device is configured to check, before updating the one or more features, whether the data received meets predefined safety criteria, and to update the one or more features with received data that meets the predefined safety criteria.

19. The system of claim 13, wherein
the low power wide area network is a low power long range wide area network; and
the at least one electronic part-powered unit is an end-device in the low power long range wide area network.

* * * * *